United States Patent
Whitehouse et al.

(10) Patent No.: US 10,333,313 B2
(45) Date of Patent: Jun. 25, 2019

(54) ELECTRICAL ASSEMBLY

(71) Applicant: General Electric Technology GmbH, Baden (CH)

(72) Inventors: Robert Stephen Whitehouse, Stafford (GB); Carl David Barker, Stafford (GB); Andrzej Adamczyk, Stafford (GB)

(*) Notice: Subject to any disclaimer, the term of this patent is extended or adjusted under 35 U.S.C. 154(b) by 0 days.

(21) Appl. No.: 15/748,717

(22) PCT Filed: Jul. 28, 2016

(86) PCT No.: PCT/EP2016/068111
§ 371 (c)(1),
(2) Date: Jan. 30, 2018

(87) PCT Pub. No.: WO2017/017240
PCT Pub. Date: Feb. 2, 2017

(65) Prior Publication Data
US 2019/0013674 A1     Jan. 10, 2019

(30) Foreign Application Priority Data

Jul. 30, 2015   (GB) .................................. 1513402.6

(51) Int. Cl.
*H02M 5/458*    (2006.01)
*H02J 3/36*    (2006.01)
(Continued)

(52) U.S. Cl.
CPC ............... *H02J 3/36* (2013.01); *H01H 9/548* (2013.01); *H01H 33/596* (2013.01); *H02J 1/08* (2013.01); *H02J 2003/365* (2013.01); *Y02E 60/60* (2013.01)

(58) Field of Classification Search
CPC .... H02M 7/7575; H02M 5/458; H02H 7/261; H02H 7/268; H02J 3/36
See application file for complete search history.

(56) References Cited

U.S. PATENT DOCUMENTS

2013/0020881 A1*   1/2013  Panousis ............. H01H 33/596
                                                             307/113
2015/0002977 A1    1/2015  Dupraz et al.

FOREIGN PATENT DOCUMENTS

CN      104620345 A    5/2015
EP      3 032 677 A1   6/2016
(Continued)

OTHER PUBLICATIONS

Combined Search and Examination Report issued in connection with corresponding GB Application No. 1513402.6 dated Jan. 21, 2016.
(Continued)

*Primary Examiner* — Jue Zhang
*Assistant Examiner* — Afework S Demisse
(74) *Attorney, Agent, or Firm* — Eversheds Sutherland (US) LLP (57) ABSTRACT

There is provided an electrical assembly for use in an electrical system. The electrical assembly comprises a DC path. The DC path includes: a DC power transmission medium; and a current commutation device, the current commutation device including a switching element and an energy absorbing element, the switching element arranged to permit a current flowing, in use, through the DC path to flow through the switching element and at the same time bypass the energy absorbing element, wherein the electrical assembly further includes a control unit programmed to selectively control the switching of the switching element to commutate the current directly from the switching element to the energy absorbing element in order to increase the resultant voltage drop caused by the flow of direct current through the DC path in which the current commutation device is connected and thereby oppose the flow of the current through the DC path.

17 Claims, 2 Drawing Sheets

(51) Int. Cl.
*H01H 9/54* (2006.01)
*H01H 33/59* (2006.01)
*H02J 1/08* (2006.01)

(56) References Cited

FOREIGN PATENT DOCUMENTS

| | | |
|---|---|---|
| EP | 2 670 013 B1 | 9/2016 |
| GB | 2519791 A | 5/2015 |
| GB | 2540813 A | 2/2017 |
| WO | 2012/055447 A1 | 5/2012 |
| WO | 2013/127463 A1 | 9/2013 |
| WO | 2014/177874 A2 | 11/2014 |
| WO | 2015/078525 A1 | 6/2015 |

OTHER PUBLICATIONS

International Search Report and Written Opinion issued in connection with corresponding PCT Application No. PCT/EP2016/068111 dated Oct. 13, 2016.

International Preliminary Report on Patentability issued in connection with corresponding PCT Application No. PCT/EP2016/068111 dated Jan. 30, 2018.

First Office Action and Search Report issued in connection with corresponding CN Application No. 201680044379.3 dated Nov. 12, 2018 (English Translation not Available).

\* cited by examiner

ELECTRICAL ASSEMBLY

BACKGROUND OF THE INVENTION

This invention relates to an electrical assembly and an electrical system, in particular a high voltage direct current (HVDC) power transmission network.

BRIEF DESCRIPTION OF THE INVENTION

An electrical system may include a power source, such as a battery, that is connected to a load via one or more current-carrying conductors, or multiple power sources that are connected to multiple loads using a network of current-carrying conductors.

An example of an electrical system is a DC power grid that requires multi-terminal interconnection of HVDC converters, whereby power can be exchanged on the DC side using two or more HVDC converters electrically connected together. Each HVDC converter acts as either a source or sink to maintain the overall input-to-output power balance of the DC power grid whilst exchanging the power as required. The DC power grid relies on a network of DC power transmission lines or cables to achieve multi-terminal interconnection of the HVDC converters.

According to a first aspect of the invention, there is provided an electrical assembly for use in an electrical system, the electrical assembly comprising a DC path, the DC path including: a DC power transmission medium, and a current commutation device, the current commutation device including a switching element and an energy absorbing element. The switching element is arranged to permit a current flowing, in use, through the DC path to flow through the switching element and at the same time bypass the energy absorbing element. The electrical assembly further includes a control unit programmed to selectively control the switching of the switching element to commutate the current directly from the switching element to the energy absorbing element in order to increase the resultant voltage drop caused by the flow of direct current through the DC path in which the current commutation device is connected and thereby oppose the flow of the current through the DC path.

A DC power transmission medium may be any medium that is capable of transmitting electrical power between two or more electrical elements. Such a medium may be, but is not limited to, a submarine DC power transmission cable, an overhead DC power transmission line or cable and an underground DC power transmission cable.

The flow of electrical current through the DC path results in a voltage drop that can change the flow of current in the DC power transmission medium and associated DC electrical system. This change in flow of current may result in the overloading of the DC power transmission medium or any other DC power transmission medium connected therewith, i.e. may cause the DC power transmission medium or any other DC power transmission medium connected therewith to operate beyond its rated conditions.

The provision of the current commutation device and control unit in the electrical assembly enables the current flowing through the DC path, and thereby through the switching element, to be directly commutated to the energy absorbing element. Commutation of the current flowing through the DC path from the switching element to the energy absorbing element results in the increase of the apparent resistance of the DC path that has the effect of opposing the flow of the current in the DC path and thereby partly or wholly redirecting (or diverting) the current into one or more other DC transmission paths in the associated DC electrical system, thus avoiding the undesirable effects caused by the overloading of the DC power transmission medium.

It will be appreciated that the current commutation device and the electrical assembly is not configured to be capable of breaking a current flowing through the DC path, i.e. neither the current commutation device nor the electrical assembly is a circuit breaker. Accordingly there is no requirement for the current commutation device or any of its components to have a high voltage rating to enable it or the electrical assembly to break a current flowing through the DC path.

Instead the current commutation device is configured to have a voltage rating that enables the energy absorbing element to increase the resultant voltage drop caused by the flow of direct current through the DC path in which the current commutation device is connected and thereby oppose the flow of the current through the DC path.

For example, in a DC electrical system with an operating voltage rating of 320 kV and a full load current rating of 1.5 kA, the DC power transmission medium may have a length of 200 km, an operating current rating of 1 kA and an operating voltage rating of 320 kV. This results in the DC power transmission medium having a resistance of approximately 2.4Ω, which gives (at full rated load for the DC power transmission medium) a voltage drop of approximately 2.4 kV which is a dominant factor in determining the voltage rating of the current commutation device of the invention. Under such circumstances, an exemplary voltage rating of the current commutation device may be 2 kV to 4 kV, which is roughly two orders of magnitude smaller than the operating voltage rating of the DC power transmission medium.

The configuration of the voltage rating of the current commutation device in this manner not only permits the use of a relatively small and low-cost current commutation device, but also results in negligible losses in the current commutation device when compared to the overall losses in the electrical system.

In the electrical assembly of the invention, the DC path may further include: a mechanical switch connected to the DC power transmission medium; and a controller configured to selectively operate the mechanical switch to switch the DC power transmission medium out of circuit. The control unit may be programmed to selectively control the switching of the switching element to commutate the current directly from the switching element to the energy absorbing element to thereby force the current in the DC power transmission medium to drop to a value that permits safe opening of the mechanical switch prior to the controller operating the mechanical switch to switch the DC power transmission medium out of circuit.

The control unit may be programmed to selectively control the switching of the switching element to commutate the current directly from the switching element to the energy absorbing element to thereby force the current in the DC power transmission medium to drop to a value that permits arcless opening of the mechanical switch prior to the controller operating the mechanical switch to switch the DC power transmission medium out of circuit.

This results in an improved operation of the mechanical switch to switch the DC power transmission medium out of circuit, since there is no need for the formation of an arc in the mechanical switch. This not only permits a reduction in the duty of the mechanical switch, but also allows for a simpler design of the mechanical switch.

An alternative to the invention would be to rely on the formation of an arc in the mechanical switch, where the arc voltage provides a back electromotive force (EMF) to oppose the flow of current through the DC path. A second alternative to the invention would be to connect each of a resonant circuit and a surge arrester in parallel with the mechanical switch, where the formation of an arc in the mechanical switch triggers a resonance in the resonant circuit, and where a back EMF is generated by the surge arrester after the arc is extinguished. In both alternatives, the mechanical switch has to endure several milliseconds of arcing, with peak arc currents reaching twice the value of the commutated current. Arcing not only generates a substantial amount of heat, but also causes pitting of the surface area of the contacts of the mechanical switch. It can be, therefore, more difficult and expensive to design a mechanical switch that needs to cope with arcing duty than it is to design a mechanical switch that can be operated to open under arcless conditions.

The control unit may be programmed to selectively control the switching of the switching element to commutate the current directly from the switching element to the energy absorbing element to thereby damp any power oscillation present in the DC path prior to the controller operating the mechanical switch to switch the DC power transmission medium out of circuit.

This results in an improved operation of the mechanical switch to switch the DC power transmission medium out of circuit, since the current in the DC path can be indirectly reduced to damp any power oscillation present in the DC path that would have otherwise hampered the ability of the mechanical switch to safely open. This can be particularly beneficial when it is difficult and/or impractical to reduce the current to zero without disrupting the flow of power in the associated DC electrical system, such as a meshed DC electrical system.

Also, by configuring the current commutation device to enable direct commutation of the current from the switching element to the energy absorbing element, the electrical assembly is able to respond quickly to a need to reduce the current in the DC path, for example, in the event of a fault in the DC power transmission medium. This in turn reduces the time delay in switching the DC power transmission medium out of circuit.

The requirement to switch the DC power transmission medium out of circuit may also arise under non-fault circumstances, which may include operational circumstances such as DC power transmission medium maintenance or segregation for transmission security reasons.

The configuration of the electrical system in accordance with the invention therefore enables the coordinated operations of the current commutation device and mechanical switch to switch the DC power transmission medium out of circuit whilst minimally impacting the rest of the electrical system, thus permitting the rest of the electrical system to continue normal service without interruption.

One alternative to the invention would be to open DC circuit breakers to interrupt the flow of current in a faulty DC power transmission medium after the fault is detected and its location is identified. Whilst the use of DC circuit breakers permits isolation of the faulty DC power transmission medium to allow the rest of the electrical system to continue its operation, presently available DC circuit breakers tend to be relatively large, bulky and expensive when compared to the electrical assembly of the invention.

Another alternative to the invention would be to block the flow of power from one or more external sources into the electrical system either by operating the associated converter(s) to block the flow of power or by opening one or more AC circuit breakers connected between the external source(s) and converter(s) if the associated converter(s) is/are of the non-blocking type. This eventually allows the current in the faulty DC power transmission medium to be reduced to zero, and thereby allows the rest of the electrical system to be restored to normal service. However, the current will temporarily be in the form of energy "trapped" in the system inductance of the DC electrical system and continues to persist until the current decays through dissipation losses in the DC electrical system. It typically takes several hundred milliseconds for the current circulating in the DC electrical system to decay to a value sufficiently low that would permit the restart of power transmission. The combination of the time required for the decay in the circulating current and the delays associated with opening and reclosing the circuit breaker(s) connected between the external source(s) and converter(s) could result in a significant period of loss of transmission capability in the electrical system. This in turn would have undesirable consequences on other electrical systems and their components connected to the electrical system.

A further alternative to the invention would be to configure the electrical system to permit a shift from a symmetric voltage of ±1 p.u. to an asymmetric voltage of 2 p.u. and 0 p.u., and to rely on control action of the converters to reduce a current flowing in a faulty DC power transmission medium to zero. Under these conditions faults between the electrical system and ground are considered to be high impedance faults and the current flowing into the fault is relatively small. Once the location of the fault is detected, control action of the converters can be then used to force the current in the faulty DC power transmission medium to zero, before mechanical switchgear, e.g. AC circuit breakers, is operated to disconnect the faulty DC transmission path. Forcing the current to zero in this manner, however, requires the coordination of all the converters associated with the electrical system, thus requiring a complex and expensive communications system to enable performance of the coordination. In addition, it can be difficult to implement such a communication system for certain topologies of the electrical system. Furthermore, operation of the electrical system at twice the nominal voltage for a significant period of time would require all of its components and associated converters to be suitably rated to handle twice the nominal voltage, thus resulting in increased size, weight and costs of the electrical system.

The configuration of the electrical system in accordance with the invention provides a reliable means for reducing the flow of current in a DC power transmission medium that minimises or obviates the need for any of the aforementioned alternatives, thus removing their associated disadvantages.

Furthermore, the configuration of the electrical system in accordance with the invention does not require all of its components and associated converters to be suitably rated to handle twice the nominal voltage.

Moreover, the operation of the current commutation device to directly commutate a current directly from the switching element to the energy absorbing element may be optionally carried out independently of the operation of the converters that form part of or are associated with the electrical system. This is usually the case when there are multiple alternative and/or parallel DC paths between the converters in the DC electrical system, which may be in the form of a meshed or grid system).

Alternatively, the operation of the current commutation device to directly commutate a current directly from the switching element to the energy absorbing element may be optionally carried with small changes in the operation of the converters that form part of or are associated with the electrical system. This is usually the case when the DC path defines a single connection between a converter (or a group of converters) and the rest of the DC electrical system, e.g. a radial connection.

The mechanical switch may be incorporated into various DC switching apparatus. For example, the DC path may include a DC switchgear, the mechanical switch forming part of the DC switchgear, and/or wherein the mechanical switch may be a disconnector (also known as an isolator).

The configuration of the current commutation device may vary depending on the requirements of the electrical system.

Optionally, in embodiments employing the use of the mechanical switch, the current commutation device may be connected in series with the mechanical switch. Such an arrangement provides a reliable means of coordinating the operations of the current commutation device and the mechanical switch to switch the DC power transmission medium out of circuit.

In embodiments of the invention the switching element may be an electronic switching element and/or a semiconductor switching element. This further enhances the ability of the electrical assembly to respond quickly to a need to control the current in the DC path. The switching element may include a single switching device or a plurality of switching devices, e.g. a plurality of series-connected or parallel-connected switching devices.

In further embodiments of the invention the energy absorbing element may include a linear resistor and/or a non-linear resistor. The number of linear resistors and/or non-linear resistors in the energy absorbing element may vary depending on the required control of the current in the DC path, e.g. the required rate of change of the current in the DC path.

The rating of the energy absorbing element is determined by the rated direct current, the resistance of the DC power transmission medium and the time required for the operation of the current commutation device. For example, a rated direct current of 1.5 kA, a resistance of the DC power transmission medium of 2.4Ω and the time required for the operation of the current commutation device of 100 ms would yield a rating of the energy absorbing element of approximately 540 kJ. In practice, the rating of the energy absorbing element may be less, but still in the range of a few hundred kJ.

In still further embodiments of the invention the energy absorbing element may be connected in parallel with the switching element. Such an arrangement of the energy absorbing element and the switching element provides a reliable means of directly commutating the current from the switching element to the energy absorbing element.

The components of the electrical assembly may vary in arrangement.

In embodiments of the invention the current commutation device may be connected in series with the DC power transmission medium. In such embodiments employing the use of a mechanical switch, the current commutation device may be used to both indirectly force the current in the DC power transmission medium to drop to a value that permits safe opening of the mechanical switch prior to the controller operating the mechanical switch to switch the DC power transmission medium out of circuit, and damp any power oscillation present in the DC path prior to the controller operating the mechanical switch to switch the DC power transmission medium out of circuit.

In further embodiments of the invention the DC path may further include an additional DC power transmission medium operably connected to the DC power transmission medium.

In such embodiments employing the use of a mechanical switch, the current commutation device may be connected in series with the additional DC power transmission medium. In such embodiments the current commutation device may be used to both indirectly force the current in the additional DC power transmission medium to drop to a value that permits safe opening of the mechanical switch prior to the controller operating the mechanical switch to switch the additional DC power transmission medium out of circuit, and damp any power oscillation present in the DC path prior to the controller operating the mechanical switch to switch the additional DC power transmission medium out of circuit.

In other such embodiments the DC path may further include an additional current commutation device, the current commutation device and the additional current commutation devices being connected in series with the DC power transmission medium and the additional DC power transmission medium respectively.

In such embodiments employing the use of a mechanical switch, the current commutation device may be used to indirectly force the current in the DC power transmission medium to drop to a value that permits safe opening of the mechanical switch prior to the controller operating the mechanical switch to switch the DC power transmission medium out of circuit, and the additional current commutation device may be used to damp any power oscillation present in the DC path prior to the controller operating the mechanical switch to switch the DC power transmission medium out of circuit.

In other such embodiments the additional current commutation device may be used to indirectly force the current in the DC power transmission medium to drop to a value that permits safe opening of the mechanical switch prior to the controller operating the mechanical switch to switch the DC power transmission medium out of circuit, and the current commutation device may be used to damp any power oscillation present in the DC path prior to the controller operating the mechanical switch to switch the DC power transmission medium out of circuit.

Accordingly, the current commutation device and the additional current commutation device can be optimised independently of each other and in accordance with their respective current control duties.

In embodiments of the invention employing the use of a mechanical switch, both current commutation devices may be used to force the current in the DC power transmission medium to drop to a value that permits safe opening of the mechanical switch prior to the controller operating the mechanical switch to switch the DC power transmission medium out of circuit, and/or both current commutation devices may be used to damp any power oscillation present in the DC path prior to the controller operating the mechanical switch to switch the DC power transmission medium out of circuit.

In embodiments of the invention the control unit may be programmed to selectively switch the switching element on and off a plurality of times to control the commutation of the current directly from the switching element to the energy absorbing element. Repeatedly switching the switching element on and off results in the controlled variation of the apparent resistance of the DC path. Such variation can be performed to modify the flow of the current in the DC path. For example, in view of the time-varying nature of power oscillations, the switching element may be switched on and off a plurality of times to damp one or more power oscillations present in the DC path.

Optionally, the DC path may further include a current bypass device arranged to permit selective formation of a current bypass path, and the current bypass path when formed permits a current flowing, in use, through the DC path to flow the current bypass path and at the same time bypass the current commutation device. This permits the current commutation device to be bypassed under high fault current conditions or when the current commutation device is faulty.

According to a second aspect of the invention, there is provided an electrical system comprising a plurality of interconnected DC transmission paths, and an electrical assembly, one of the plurality of interconnected DC transmission paths including the DC path of the electrical assembly. The control unit is programmed to selectively control the switching of the switching element to commutate the current directly from the switching element to the energy absorbing element in order to increase the resultant voltage drop caused by the flow of direct current through the DC path in which the current commutation device is connected and thereby oppose the flow of the current through the DC path to commutate the current from the DC path to the other DC transmission path or at least one of the other DC transmission paths.

The plurality of interconnected DC transmission paths may be arranged so that the voltage drop caused by the flow of direct current through the or each other of the plurality of interconnected DC transmission paths is independent of the control of the current commutation device to increase the resultant voltage drop caused by the flow of direct current through the DC path.

Such an electrical system may be, for example, a multi-terminal DC electrical network including a plurality of DC terminals, whereby each DC transmission path is connected between multiple DC terminals, or may be an HVDC station.

The electrical system of the invention may include a plurality of electrical assemblies according to any one of the embodiments of the first aspect of the invention, wherein each one of the plurality of interconnected DC transmission paths including a respective one of the DC paths of the plurality of electrical assemblies. The plurality of interconnected DC transmission paths are arranged so that the voltage drop caused by the flow of direct current through each of the plurality of DC paths is independent of the control of the respective current commutation device to increase the resultant voltage drop caused by the flow of direct current through the or each other of the plurality of DC paths.

In such embodiments multiple current commutation devices may be simultaneously operated to control the redistribution of the current between the various DC paths.

The corresponding advantages described above with reference to the first aspect of the invention apply mutatis mutandis to the second aspect of the invention.

BRIEF DESCRIPTION OF THE DRAWINGS

Preferred embodiments of the invention will now be described, by way of non-limiting examples, with reference to the accompanying drawings in which.

DETAILED DESCRIPTION OF THE DRAWINGS

Figure 1:
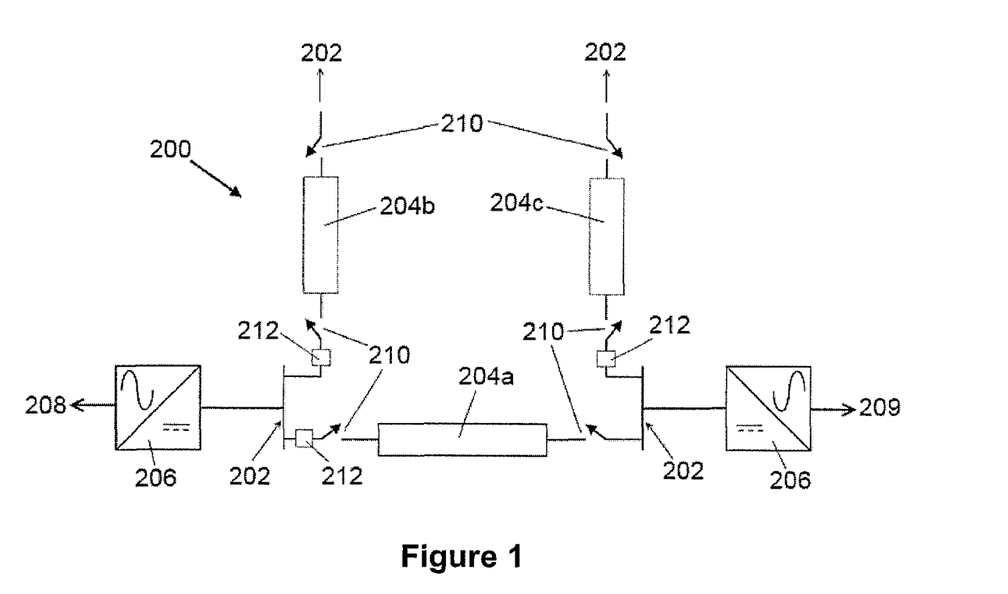
FIG. 1 shows schematically an electrical system in the form of a DC power grid according to a first embodiment of the invention.

An electrical system in the form of a DC power grid according to a first embodiment of the invention is shown in FIG. 1 and is designated generally by the reference numeral 200.

The DC power grid 200 comprises a plurality of DC terminals 202, and a plurality of DC power transmission lines 204A, 204B, 204C. In use, each DC terminal 202 is operatively connected to the DC side of a respective AC-DC converter 206, which in turn is connected to a respective AC electrical network 208, 209.

In the embodiment shown in FIG. 1, a first DC power transmission line 204A is arranged to interconnect a first DC terminal 202 and a second DC terminal 202, a second DC power transmission line 204B is arranged to interconnect the first DC terminal 202 and a third DC terminal (not shown), and a third DC power transmission line 204C is arranged to interconnect the second DC terminal 202 and a fourth DC terminal (not shown).

Each end of each DC power transmission line 204A, 204B, 204C is connected in series with a respective disconnector 210. In use, each disconnector 210 can be operated to open to selectively block current from flowing in the corresponding DC power transmission line 204A, 204B, 204C when the current flowing in the corresponding DC power transmission line 204A, 204B, 204C is at a current threshold of zero or substantially zero, i.e. a value that permits safe opening of each disconnector 210.

Each series-connection of each DC power transmission line 204A, 204B, 204C and the corresponding disconnectors 210 is further connected in series with a respective current commutation device 212 to define a respective electrical assembly.

Figure 2:
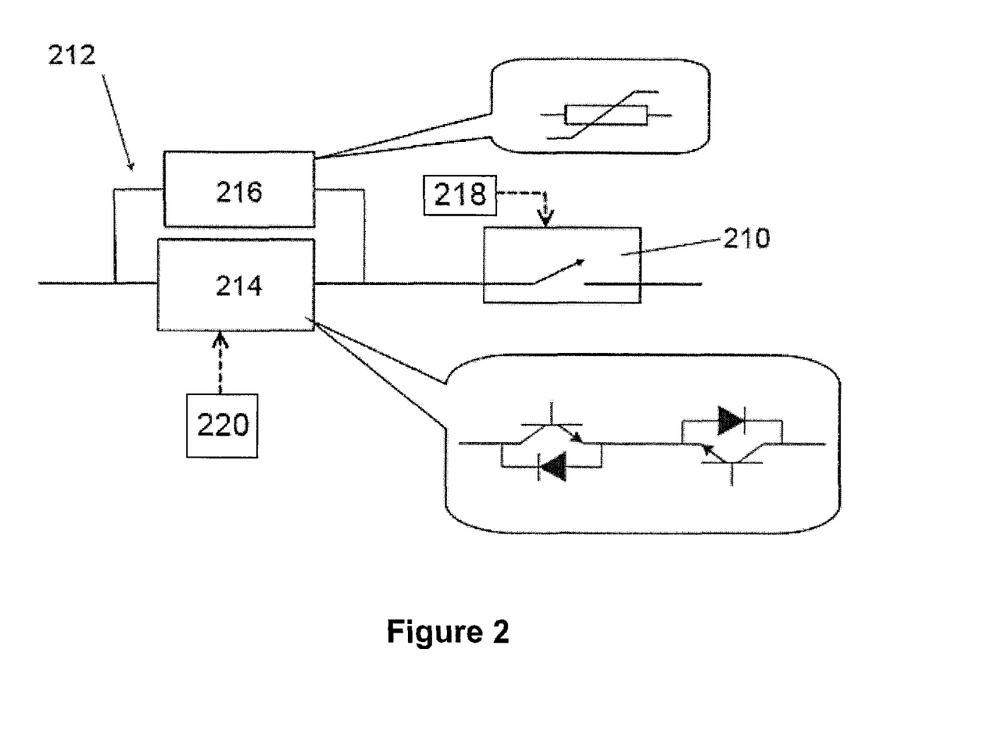
FIG. 2 shows schematically an electrical assembly according to a second embodiment of the invention that forms part of the DC power grid of FIG. 1.

As shown in FIG. 2, each current commutation device 212 includes a switching element 214 connected in parallel with an energy absorbing element 216. The switching element 214 includes a pair of inverse-series connected switching devices in the form of insulated gate bipolar transistors (IGBT), whereby each IGBT is connected in parallel with an anti-parallel diode. The energy absorbing element 216 includes a surge arrester, e.g. a zinc-oxide surge arrester.

It is envisaged that, in other embodiments of the invention, the number of switching devices in each switching element 214 may vary and/or the number of energy absorbing elements 216 in each current commutation device 212 may vary. It is further envisaged that, in still other embodiments of the invention, the switching element 214 may instead or additionally include different switching devices, such as IGBTs, IGCTs, GTO, other self-commutating switching devices, etc and/or the energy absorbing element 216 may instead or additionally include another type of non-linear resistor and/or a linear resistor.

Each electrical assembly further includes a respective controller 218 configured to selectively operate the corresponding disconnector 210 to disconnect the corresponding DC power transmission line 204. Each controller 218 may be programmable to operate the corresponding disconnector 210 or may be configured to mechanically operate the corresponding disconnector 210.

Each electrical assembly further includes a control unit 220 programmed to selectively control the switching of the switching element 214, i.e. to selectively turn on and off the switching element 214.

It will be appreciated that some or all of the controllers 218 and control units 220 may be separate from each other. It will be further appreciated that some or all of the controllers 218 and the control units may be integral with each other 220.

During normal operation, the DC power grid 200 is used to transfer power, for example, from offshore wind farms 208 to on-shore AC systems 209 via the converters 206 and the DC power transmission lines 204A, 204B, 204C. During such normal operation, a current flows through each DC power transmission line 204A, 204B, 204C, and therefore also flows through each disconnector 210 and each current commutation device 212. More specifically, when the current flows through a given current commutation device 212, the parallel connection of the switching element 214 and the energy absorbing element 216 means that the current preferentially flows through the switching element 214 due to the resistance of the energy absorbing element 216 when the switching element 214 is switched on.

A fault or other abnormal operating condition may occur in the DC power grid 200. For example, one of the DC power transmission lines 204A, 204B, 204C of the DC power grid 200 may experience a pole-to-ground fault. The presence of the fault or other abnormal operating condition may result in a high fault current in the faulty DC power transmission line 204A, 204B, 204C and therefore in the DC power grid 200.

For the purposes of illustrating how the invention works, it is assumed that the first DC power transmission line 204A is the faulty DC power transmission line, but it will be understood that the following description of the working of the invention applies mutatis mutandis to a fault occurring in any of the other DC power transmission lines 204B, 204C.

In a first example of the working of the invention, the first DC power transmission line 204A, the corresponding disconnectors 210 and the corresponding current commutation device 212 together define a DC path.

Following occurrence of the fault in the first DC power transmission line 204A, the control unit 220 controls switching of the switching element 214 to open and thereby commutate the current directly from the switching element 214 to the energy absorbing element 216. The commutation of the current flowing through the DC path directly from the switching element 214 to the energy absorbing element 216 results in the increase of the resultant voltage drop caused by the flow of direct current through the DC path and therefore the apparent resistance of the DC path that has the effect of opposing the flow of the current in the DC path and thereby causing it to wholly or partly flow elsewhere in the DC power grid 200, i.e. wholly or partly redirect the current into the other DC power transmission lines 204B, 204C. In this instance the resistance of the energy absorbing element 216 is suitably rated to indirectly force the current in the first DC power transmission line 204A to drop to a value that permits safe opening of the disconnectors 210 prior to the controllers 218 operating the disconnectors 210 to disconnect the first DC power transmission line 204A. In this case the target value is zero or substantially zero.

Meanwhile the fault in the first DC power transmission line 204A may result in the occurrence of power oscillations in the DC path. Additionally or alternatively the power oscillations in the DC path could be caused by the converters 206 or the AC electrical networks 208, 209, or by one or more faults occurring elsewhere in the DC power grid 200. Thus, a direct current plus one or more oscillatory components will flow in the DC path as a result of the inductance and capacitance of the DC path. Whilst the power oscillations will naturally dampen with time, such damping could take a considerable amount of time so as to hamper the ability of the disconnectors 210 to safely open to disconnect the first DC power transmission line 204.

In view of the time-varying nature of the power oscillations, the control unit may optionally switch the switching element 214 on and off a plurality of times at a specific frequency (which may range from a few Hz to a few kHz) to control the commutation of current directly from the switching element 214 to the energy absorbing element 216 to damp the power oscillations present in the DC path prior to the controllers 218 operating the disconnectors 210 to disconnect the first DC power transmission line 204A. Repeatedly switching the switching element 214 on and off at the specific frequency results in the controlled variation of the apparent resistance of the DC path, whereby the controlled apparent resistance can be varied to modify the flow of the current in the DC path.

The switching of the switching element 214 on and off a plurality of times may be carried out as a pulse width modulation at a frequency of, for example, 500 Hz.

When the fault current in the first DC power transmission line 204A is reduced to the target value of zero or substantially zero, the controllers 218 operate the disconnectors 210 connected at both ends of the first DC power transmission line 204A to open and thereby block current from flowing in the faulty first DC power transmission line 204A.

Meanwhile the rest of the DC power grid 200 is able to continue its normal service without interruption.

By configuring the current commutation device 212 to enable direct commutation of the current from the switching element 214 to the energy absorbing element 216, the electrical assembly is able to respond quickly to a need to control the current in the DC path. This in turn reduces the time delay in disconnecting the first DC power transmission line 204A.

The inclusion of the switching element 214 in the electrical assembly not only permits the use of a relatively small and low-cost switching element 214, but also results in negligible losses in the current commutation device 212 when compared to the overall losses in the DC power grid 200.

In a second example of the working of the invention, the disconnectors 210 connected at both ends of the first DC power transmission line 204A may be permitted to safely open through operation of the current commutation device 212 corresponding to another DC power transmission line 204B, 204C, which in the embodiment shown may be the second or third DC power transmission line 204B, 204C. In this example, the first DC power transmission line 204A, the other DC power transmission line 204B, 204C, the corresponding disconnectors 210 and the corresponding current commutation devices 212 together define a DC path.

The working of the invention in the second example is identical to the working of the invention in the first example, except that the operation of the current commutation device 212 corresponding to the first DC power transmission line 204A is replaced by the operation of the current commutation device 212 corresponding to the other DC power transmission line 204B, 204C. Whilst this still results in the increase of the resultant voltage drop caused by the flow of direct current through the DC path and therefore the apparent resistance of the DC path that has the effect of opposing the flow of the current in the DC path and thereby cause it to flow elsewhere in the DC power grid 200, the resistance of the energy absorbing element 216 is suitably rated to indirectly (as opposed to directly) force the current in the first DC power transmission line 204A to drop to a value that permits safe opening of the disconnectors 210 corresponding to the first DC power transmission line 204A prior to the controllers 218 operating the disconnectors 210 to disconnect the first DC power transmission line 204A. The current commutation device 212 corresponding to the other DC power transmission line 204B, 204C can be operated to increase the resultant voltage drop caused by the flow of direct current through the DC path and therefore the apparent resistance of the DC path in order to damp the power oscillations present in the DC path prior to the controllers 218 operating the disconnectors 210 to disconnect the first DC power transmission line 204A.

In a third example of the working of the invention, the disconnectors 210 connected at both ends of the first DC power transmission line 204A may be permitted to safely open through operation of both of the current commutation devices 212 corresponding to the first DC power transmission line 204A and the other DC power transmission line 204B, 204C. In this example, the first DC power transmission line 204A, the other DC power transmission line 204B, 204C, the corresponding disconnectors 210 and the corresponding current commutation devices 212 together define a DC path.

In this example, the operation of the current commutation device 212 corresponding to the first DC power transmission line 204A is complemented by the operation of the current commutation device 212 corresponding to the other DC power transmission line 204B, 204C.

The current commutation device 212 corresponding to the first DC power transmission line 204A may be operated to indirectly force the current in the first DC power transmission line 204A to drop to a value that permits safe opening of the disconnectors 210 corresponding to the first DC power transmission line 204A prior to the controllers 218 operating the disconnectors 210 to disconnect the first DC power transmission line 204A, while the current commutation device 212 corresponding to the other DC power transmission line 204B, 204C may be operated to increase the resultant voltage drop caused by the flow of direct current through the DC path and therefore the apparent resistance of the DC path in order to damp the power oscillations present in the DC path prior to the controllers 218 operating the disconnectors 210 to disconnect the first DC power transmission line 204A.

Alternatively the current commutation device 212 corresponding to the other DC power transmission line 204B, 204C may be operated to indirectly force the current in the first DC power transmission line 204A to drop to a value that permits safe opening of the disconnectors 210 corresponding to the first DC power transmission line 204A prior to the controllers 218 operating the disconnectors 210 to disconnect the first DC power transmission line 204A, while the current commutation device 212 corresponding to the first DC power transmission line 204A may be operated to increase the resultant voltage drop caused by the flow of direct current through the DC path and therefore the apparent resistance of the DC path in order to damp the power oscillations present in the DC path prior to the controllers 218 operating the disconnectors 210 to disconnect the first DC power transmission line 204.

Further alternatively both current commutation devices 212 may be operated to force the current in the first DC power transmission line 204A to drop to a value that permits safe opening of the disconnectors 210 corresponding to the first DC power transmission line 204A prior to the controllers 218 operating the disconnectors 210 to disconnect the first DC power transmission line 204A, and/or both current commutation devices 212 may be operated to increase the resultant voltage drop caused by the flow of direct current through the DC path and therefore the apparent resistance of the DC path in order to damp the power oscillations present in the DC path prior to the controllers 218 operating the disconnectors 210 to disconnect the first DC power transmission line 204A.

The requirement to disconnect a given DC power transmission line 204A, 204B, 204C may also arise under non-fault circumstances, which may include operational circumstances such as DC power transmission line maintenance or segregation for transmission security reasons.

Figure 3:
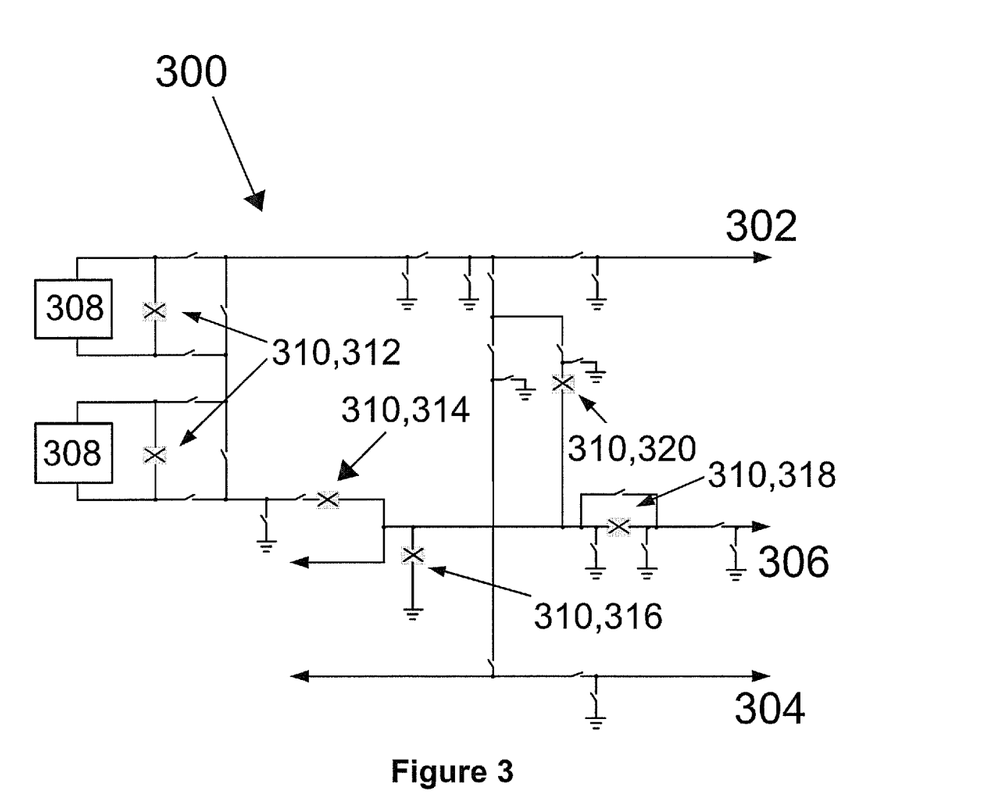
FIG. 3 shows schematically an electrical system in the form of a HVDC station according to a third embodiment of the invention.

An electrical system in the form of a HVDC station according to a third embodiment of the invention is shown in FIG. 3 and is designated generally by the reference numeral 300.

FIG. 3 shows a single-line diagram of the HVDC station, which comprises a first pole 302, a second pole 304, an electrode line 306, and switching valves 308 connected between the first pole 302 and the electrode line 306.

The HVDC station 300 includes a plurality of DC paths, each of which includes a respective DC switchgear 310 connected to a DC power transmission medium. The plurality of DC switchgears 310 includes:

a plurality of bypass switches 312, each of which is connected in parallel with a respective one of the switching valves 308;
a neutral bus switch 314 connected between the switching valves 308 and the electrode line 306;
a neutral bus grounding switch 316 connected between the electrode line 306 and ground;
a metallic return transfer switch 318 connected in the electrode line 306; and
a ground return transfer switch 320 connected between the electrode line 306 and a mid-point between the first and second poles 302, 304.

Each DC switchgear 310 is identical in structure to the arrangement shown in FIG. 2 in that each DC switchgear 310 includes a mechanical switch connected in series with a current commutation device 212, where the mechanical switch is in the form of a disconnector 210. It is envisaged that, in other embodiments of the invention, the disconnector 210 may be replaced by another type of mechanical switch.

In use, each DC switchgear 310 can be operated to open to selectively block current from flowing in the corresponding DC power transmission medium through the operation of the corresponding disconnector 210 to disconnect the corresponding DC power transmission medium, when the current flowing in the corresponding DC power transmission medium is at a current threshold of zero or substantially zero, i.e. a value that permits arcless opening of each disconnector 210.

The connection of each DC switchgear 310 and the corresponding DC power transmission medium defines a respective electrical assembly.

Each electrical assembly further includes a respective controller 218 configured to selectively operate the corresponding disconnector 210 to disconnect the corresponding DC power transmission medium. Each controller 218 is configured to mechanically operate the corresponding disconnector 210. Each electrical assembly further includes a control unit 220 programmed to selectively control the switching of the switching element 214, i.e. to selectively turn on and off the switching element 214.

During the operation of the HVDC station 300, direct current flows through each DC path when the corresponding DC switchgear 310 is closed. The current flows through the closed DC switchgear 310 and corresponding DC power transmission medium, and therefore also flows through the corresponding disconnector 210 and current commutation device 212. Similarly to the first embodiment of the invention, when the current flows through a given current commutation device 212, the parallel connection of the switching element 214 and the energy absorbing element 216 means that the current preferentially flows through the switching element 214 due to the resistance of the energy absorbing element 216 when the switching element 214 is switched on.

It may be required to open a given closed DC switchgear 310 to commutate a direct current as part of its normal duty, which could arise under fault or non-fault circumstances.

The opening of the given closed DC switchgear 310 to commutate a direct current is described as follows.

Initially the control unit 220 controls switching of the switching element 214 to open and thereby commutate the current directly from the switching element 214 to the energy absorbing element 216. The commutation of the current flowing through the DC path directly from the switching element 214 to the energy absorbing element 216 results in the increase of the resultant voltage drop caused by the flow of direct current through the DC path and therefore the apparent resistance of the DC path that has the effect of opposing the flow of the current in the DC path and thereby causing it to wholly or partly flow elsewhere in the HVDC station 300. In this instance the resistance of the energy absorbing element 216 is suitably rated to indirectly force the current in the corresponding DC power transmission medium to drop to a value that permits arcless opening of the corresponding disconnector 210 prior to the controller 218 operating the disconnector 210 to disconnect the corresponding DC power transmission medium. In this case the target value is zero or substantially zero.

When the current in the corresponding DC power transmission medium is reduced to the target value of zero or substantially zero, the controller 218 operates the disconnector 210 to open under arcless conditions and thereby block current from flowing in the corresponding DC power transmission medium, thus effectively disconnecting the corresponding DC power transmission medium. The opening of the disconnector 210 also provides high insulation between the terminals of the DC switchgear 310.

Since each DC switchgear 310 is not required to operate as a circuit breaker to break the direct current flowing therethrough but only required to commutate the direct current from the corresponding DC path to elsewhere in the HVDC station 300, the increase in the resultant voltage drop due to the commutation of the current directly from the switching element 214 to the energy absorbing element 216 is relatively low when compared to the nominal voltage rating of the HVDC station 300. The voltage rating of the switching element 214 can be configured to be relatively small and can be achieved with a low number of switching devices or a single bidirectional switching device.

The inclusion of the current commutation device 212 in each electrical assembly not only permits arcless opening of the mechanical switch of each DC switchgear 310, but also permits the use of a relatively small and low-cost switching element 214.

Furthermore, the energy absorbing element 216 protects the switching element 214 from voltage spikes, which may arise during the operation of the DC switchgear 310.

It will be appreciated that the control of a given current commutation device 212 to commutate the current flowing through the corresponding DC path directly from the switching element 214 to the energy absorbing element 216 has the effect of opposing the flow of the current only in the DC path in which the given current commutation device 212 is connected. In other words, the plurality of DC paths are arranged so that the voltage drop caused by the flow of direct current through each of the plurality of DC paths is independent of the control of the respective current commutation device 212 to increase the resultant voltage drop caused by the flow of direct current through each other of the plurality of DC paths.

It is envisaged that, in other embodiments, each DC power transmission line 204A, 204B, 204C may be replaced by, but is not limited to, a submarine DC power transmission cable, an overhead DC power transmission cable, an underground DC power transmission cable, or any DC power transmission medium of transmitting electrical power between two or more electrical elements.

It will be appreciated that the topologies and configurations of the electrical system, the electrical assembly and the current commutation device 212 were merely chosen to illustrate the working of the invention and that the invention is applicable to other topologies and configurations of the electrical system, the electrical assembly and the current commutation device.

The invention claimed is:

1. An electrical assembly, the electrical assembly comprising a DC path, the DC path including:
   a DC power transmission medium; and
   a current commutation device, the current commutation device including a switching element and an energy absorbing element, the switching element arranged to permit a current flowing, in use, through the DC path to flow through the switching element and at the same time bypass the energy absorbing element,
   wherein the electrical assembly further includes a control unit programmed to selectively control the switching of the switching element to commutate the current directly from the switching element to the energy absorbing element in order to increase the resultant voltage drop caused by the flow of direct current through the DC path in which the current commutation device is connected and thereby oppose the flow of the current through the DC path.

2. The electrical assembly according to claim 1; wherein the current commutation device is configured to have a voltage rating that enables the energy absorbing element to increase the resultant voltage drop caused by the flow of direct current through the DC path in which the current commutation device is connected and thereby oppose the flow of the current through the DC path.

3. The electrical assembly according to claim 1, wherein the DC path further includes:
   a mechanical switch connected to the DC power transmission medium; and
   a controller configured to selectively operate the mechanical switch to switch the DC power transmission medium out of circuit, wherein the control unit is programmed to selectively control the switching of the switching element to commutate the current directly from the switching element to the energy absorbing element to thereby force the current in the DC power transmission medium to drop to a value that permits safe opening of the mechanical switch prior to the controller operating the mechanical switch to switch the DC power transmission medium out of circuit.

4. The electrical assembly according to claim 3, wherein the control unit is programmed to selectively control the switching of the switching element to commutate the current directly from the switching element to the energy absorbing element to thereby force the current in the DC power transmission medium to drop to a value that permits arcless opening of the mechanical switch prior to the controller operating the mechanical switch to switch the DC power transmission medium out of circuit.

5. The electrical assembly according to claim 3, wherein the control unit is programmed to selectively control the switching of the switching element to commutate the current directly from the switching element to the energy absorbing element to thereby damp any power oscillation present in the DC path prior to the controller operating the mechanical switch to switch the DC power transmission medium out of circuit.

6. The electrical assembly according to claim 3, wherein the DC path includes a DC switchgear, the mechanical switch forming part of the DC switchgear, and/or wherein the mechanical switch is a disconnecter.

7. The electrical assembly according to claim 3, wherein the current commutation device is connected in series with the mechanical switch.

8. The electrical assembly according to claim 1, wherein the switching element is an electronic switching element and/or a semiconductor switching element.

9. The electrical assembly according to claim 1, wherein the energy absorbing element includes a linear resistor and/or a non-linear resistor, and/or wherein the energy absorbing element is connected in parallel with the switching element.

10. The electrical assembly according to claim 1, wherein the current commutation device is connected in series with the DC power transmission medium.

11. The electrical assembly according to claim 1, wherein the DC path further includes an additional DC power transmission medium operably connected to the DC power transmission medium.

12. The electrical assembly according to claim 11, wherein the current commutation device is connected in series with the additional DC power transmission medium, or wherein the DC path further includes an additional current commutation device, the current commutation device and the additional current commutation devices being connected in series with the DC power transmission medium and the additional DC power transmission medium respectively.

13. The electrical assembly according to Claire wherein the control unit is programmed to selectively switch the switching element on and off a plurality of times to control the commutation of the current directly from the switching element to the energy absorbing element.

14. The electrical assembly according to claim 1, wherein the DC path further includes a current bypass device arranged to permit selective formation of a current bypass path, and the current bypass path when formed permits a current flowing, in use, through the DC path to flow the current bypass path and at the same time bypass the current commutation device.

15. An electrical system comprising:
a plurality of interconnected DC transmission paths; and
the electrical assembly according to claim 1, one of the plurality of interconnected DC transmission paths including the DC path of the electrical assembly,
wherein the control unit is programmed to selectively control the switching of the switching element to commutate the current directly from the switching element to the energy absorbing element in order to increase the resultant voltage drop caused by the flow of direct current through the DC path in which the current commutation device is connected and thereby oppose the flow of the current through the DC path to commutate the current from the DC path to the other DC transmission path or at least one of the other DC transmission paths.

16. The electrical system according to claim 15, wherein the plurality of interconnected DC transmission paths are arranged so that the voltage drop caused by, the flow of direct current through the or each other of the plurality of interconnected DC transmission paths is independent of the control of the current commutation device to increase the resultant voltage drop caused by the flow of direct current through the DC path.

17. The electrical system according to claim 16, wherein each one of the plurality of interconnected DC transmission paths including a respective one of the DC paths of the plurality of electrical assemblies,
wherein the plurality of interconnected DC transmission paths are arranged so that the voltage drop caused by the flow of direct current through each of the plurality of DC paths is independent of the control of the respective current commutation device to increase the resultant voltage drop caused by the flow of direct current through the or each other of the plurality of DC paths.

* * * * *